J. ZOEBERLEIN.
Ditching Plow.

No. 109,567.  Patented Nov. 22, 1870.

UNITED STATES PATENT OFFICE.

JOHN ZOEBERLEIN, OF BALTIMORE, MARYLAND.

IMPROVEMENT IN CARRIAGE ATTACHMENTS FOR PLOWS.

Specification forming part of Letters Patent No. 109,567, dated November 2, 1870.

*To all whom it may concern:*

Be it known that I, J. ZOEBERLEIN, of Baltimore, in the State of Maryland, have invented a new and useful Carriage Attachment for Plows; and I do hereby declare that the following is a full, clear, and exact description thereof, enabling those skilled in the art to which my invention appertains to fully understand and to make and use the same, reference being had to the accompanying drawings, forming part of this specification, in which—

Figure 1:
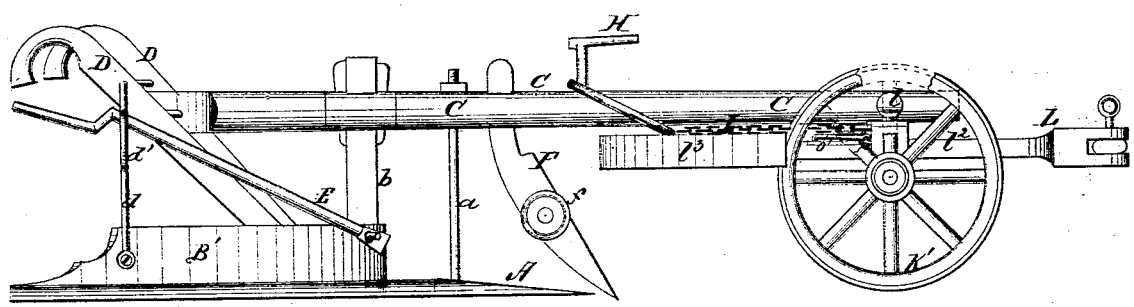
Figure 2:
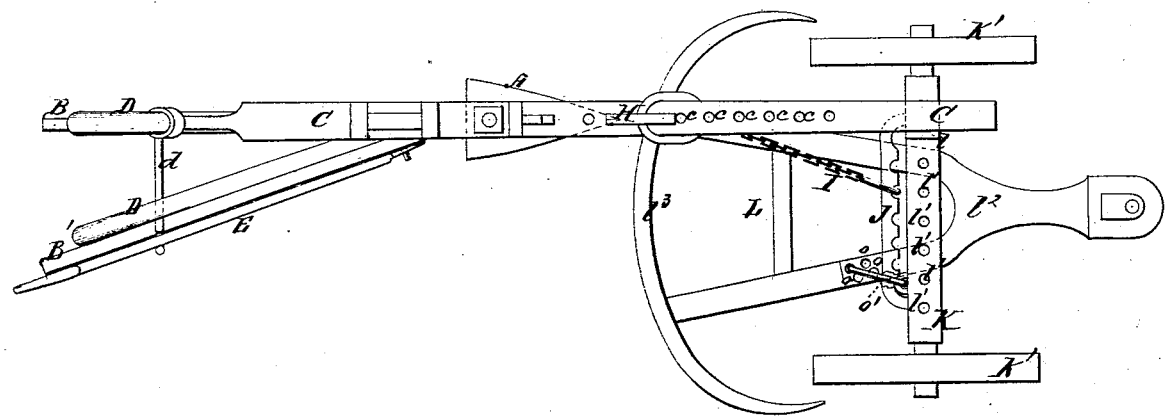

Figure 1 represents a side elevation of my invention, and Fig. 2 a plan view of the same.

The subject of my invention is a carriage adapted for the attachment of a plow, whereby the latter may be adjusted and operated more readily and with better results than heretofore.

The invention consists in the construction, arrangement, and combination of parts, as hereinafter set forth and claimed.

Similar letters in the several figures indicate corresponding parts.

In the drawings accompanying this application, A represents an ordinary plowshare or shovel, connected at its center by means of a vertical rod or standard, $a$, to the beam C, and at its rear end to the lower side of the apex of the triangular-shaped mold-board B B'. The mold-board is connected to beam C by an upright, $b$, and has attached to it the lower ends of the handles D, one of the latter passing through the beam C, to which it is suitably fastened and held to its fellow by means of a transverse metallic rod, $d$, which terminates at its projecting end into a hook, $d'$, for the purpose hereinafter explained.

E is a cleaner or knife having an opening through it for the reception of a projection fastened to the mold-board, by which its lower end is held thereto when not in use, the upper end of the handle of which, being formed or constructed with a curve or hook, so as to assist it in being held in the hook $d'$ of rod $d$, in which it is placed, for the purpose already stated, in connection with its lower or cutting edge. This knife or cleaner is for the purpose of removing dirt from the mold-board and plowshare.

F represents a curvilinear knife passing through and held in an aperture cut in the beam C and located directly in front of the plowshare A.

$f$ is a revolving circular knife, which has its bearings upon an axle secured in an aperture in knife F. The object of the knives F $f$ is to cut away any weeds or grass with which they may come in contact while the plow is in operation.

The plow-beam C is supplied with a series of apertures, $c\ c$, which are situated at suitable distances apart and extending from the knife F, or nearly so, to the outer end of the beam C.

H is a pin having its upper end bent at right angles to its lower portion and entering one of the apertures $c\ c$ in the said beam C.

I is a chain, which is supplied at one end with a loop embracing the beam C, and within which the pin H is placed, and provided at its opposite end with a link which moves on the notched bar J, the ends of which are bent so as to enter the bolster K, mounted upon and braced to an axle, with wheels K'.

$l$ designates a flat-headed pin chained to bolster K and entering one of a series of apertures, $l'\ l'$, made in the upper side of the said bolster, and against which the inner end of the beam C rests.

By means of the above-described arrangement of apertures, chain, notched bar, and pins it will be observed that the plow can be adjusted to any desired point on the bolster K, allowing the furrows to be cut at any required distance apart.

L represents a frame consisting of the bifurcated bar $l^2$ and semicircular bar $l^3$, attached on its concaved side to the ends of the prongs of the bar $l^2$, as shown in Fig. 2. The pronged portion of the said frame is made to pass through apertures cut in the bolster K. One of the prongs of said frame is pivoted in its aperture in such a manner as to allow said frame to describe the arc of a circle in its movement, so that the running-gear to which the plow is attached may be easily and readily accommodated to the required curve in turning the plow, thus acting in the capacity of a fifth-wheel. The opposite arm or prong of said frame is supplied, at or near the point of contact between it and the bolster K, with a series of holes, $o\ o$. Within any one of these holes may be inserted the hook $o'$, hung to bolster K, the object of said hook and holes being to hold the frame L at any desired angle when swung around on its pivot.

It will be noticed that the semicircular bar attached to the frame L is of such a size and so curved at its ends as to always present, at whatever angle it may be placed, a resting-surface for the end of the plow-beam.

The operation of my plow will be readily understood from the description of the construction of the same.

Having thus described my invention, what I claim, and desire to secure by Letters Patent, is—

The mounted bolster K, provided with a series of holes, $l'$, and with the notched bar J, hook $o$, and the pivoted frame L $l^2$ $l^2$, having holes $o'$, said parts constituting a carriage attachment for plows, adapted for adjustable connection with the plow-beam by means of a chain, I, substantially as and for the purpose set forth.

JOHN ZOEBERLEIN.

Witnesses:
H. C. DREXEL,
JOHN C. DISTLER,
PETER KREIS.